US011066429B2

(12) United States Patent
Knott et al.

(10) Patent No.: US 11,066,429 B2
(45) Date of Patent: *Jul. 20, 2021

(54) PROCESS FOR PRODUCING ACETOXY-BEARING SILOXANES

(71) Applicant: Evonik Operations GmbH, Essen (DE)

(72) Inventors: Wilfried Knott, Essen (DE); Horst Dudzik, Essen (DE); Frauke Henning, Essen (DE); Jan Caßens, Datteln (DE)

(73) Assignee: Evonik Operations GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/851,252

(22) Filed: Apr. 17, 2020

(65) Prior Publication Data
US 2020/0377526 A1    Dec. 3, 2020

(30) Foreign Application Priority Data
May 28, 2019 (EP) .................................... 19176872

(51) Int. Cl.
C07F 7/08    (2006.01)

(52) U.S. Cl.
CPC .................................. C07F 7/0889 (2013.01)

(58) Field of Classification Search
None
See application file for complete search history.

(56) References Cited

U.S. PATENT DOCUMENTS

| | | | |
|---|---|---|---|
| 4,066,680 A | 1/1978 | Lewis et al. | |
| 5,032,662 A * | 7/1991 | Berger | C09D 5/024 528/25 |
| 6,521,771 B2 | 2/2003 | Frommeyer et al. | |
| 6,659,162 B2 | 12/2003 | Frommeyer et al. | |
| 6,854,506 B2 | 2/2005 | Knott et al. | |
| 6,858,663 B2 | 2/2005 | Knott et al. | |
| 6,874,562 B2 | 4/2005 | Knott et al. | |
| 6,915,834 B2 | 7/2005 | Knott et al. | |
| 6,942,716 B2 | 9/2005 | Knott et al. | |
| 7,125,585 B2 | 10/2006 | Dudzik et al. | |
| 7,196,153 B2 | 3/2007 | Burkhart et al. | |
| 7,598,334 B2 | 10/2009 | Ferenz et al. | |
| 7,612,158 B2 | 11/2009 | Burkhart et al. | |
| 7,612,159 B2 | 11/2009 | Burkhart et al. | |
| 7,619,035 B2 | 11/2009 | Henning et al. | |
| 7,645,848 B2 | 1/2010 | Knott et al. | |
| 7,754,778 B2 | 7/2010 | Knott et al. | |
| 7,825,205 B2 | 11/2010 | Knott et al. | |
| 7,825,206 B2 | 11/2010 | Neumann et al. | |
| 7,825,209 B2 | 11/2010 | Knott et al. | |
| 8,138,294 B2 | 3/2012 | Henning et al. | |
| 8,247,525 B2 | 8/2012 | Schubert et al. | |
| 8,268,939 B2 | 9/2012 | Ebbrecht et al. | |
| 8,283,422 B2 | 10/2012 | Schubert et al. | |
| 8,309,664 B2 | 11/2012 | Knott et al. | |
| 8,309,673 B2 | 11/2012 | Schubert et al. | |
| 8,324,325 B2 | 12/2012 | Knott et al. | |
| 8,334,355 B2 | 12/2012 | Henning et al. | |
| 8,349,907 B2 | 1/2013 | Henning et al. | |
| 8,420,748 B2 | 4/2013 | Henning et al. | |
| 8,450,514 B2 | 5/2013 | Schubert et al. | |
| 8,455,603 B2 | 6/2013 | Ferenz et al. | |
| 8,557,944 B2 | 10/2013 | Henning et al. | |
| 8,598,295 B2 | 12/2013 | Henning et al. | |
| 8,609,798 B2 | 12/2013 | Knott et al. | |
| 8,623,984 B2 | 1/2014 | Henning et al. | |
| 8,722,834 B2 | 5/2014 | Knott et al. | |
| 8,722,836 B2 | 5/2014 | Knott et al. | |
| 8,729,207 B2 | 5/2014 | Hartung et al. | |
| 8,772,423 B2 | 7/2014 | De Gans et al. | |
| 8,778,319 B2 | 7/2014 | Herrwerth et al. | |
| 8,779,079 B2 | 7/2014 | Henning et al. | |
| 8,796,198 B2 | 8/2014 | Henning et al. | |
| 8,802,744 B2 | 8/2014 | Knott et al. | |
| 8,841,400 B2 | 9/2014 | Henning et al. | |
| 8,921,437 B2 | 12/2014 | Knott et al. | |
| 8,946,369 B2 | 2/2015 | Henning et al. | |

(Continued)

FOREIGN PATENT DOCUMENTS

| | | |
|---|---|---|
| CA | 1 125 780 A | 6/1982 |
| CN | 105 885 051 | 8/2016 |
| EP | 3321304 A1 | 5/2018 |
| EP | 3 401 353 A1 | 11/2018 |
| EP | 3 467 006 A1 | 4/2019 |
| EP | 3 492 513 A1 | 6/2019 |
| WO | 02/060621 A2 | 8/2002 |
| WO | 02/094483 A2 | 11/2002 |
| WO | 2018/118926 A2 | 10/2010 |
| WO | 2013/010747 A1 | 1/2013 |
| WO | 2013/017365 A1 | 2/2013 |
| WO | 2015/003875 A1 | 1/2015 |
| WO | 2018/001889 A1 | 1/2018 |
| WO | 2019/076552 A1 | 4/2019 |
| WO | 2019/105608 A1 | 6/2019 |
| WO | 2019/192876 A1 | 10/2019 |
| WO | 2019/219446 A1 | 11/2019 |
| WO | 2019/219452 A1 | 11/2019 |

OTHER PUBLICATIONS

European Search Report dated Nov. 12, 2019 in EP 19176872.0 (7 pages).
Fiedel et al., U.S. Appl. No. 16/648,345, filed Mar. 18, 2020.

Primary Examiner — Alexander R Pagano
(74) Attorney, Agent, or Firm — Taylor English Duma LLP; Philip P. McCann

(57) ABSTRACT

Described is a process for producing preferably trifluoromethanesulfonic acid-acidified, end-equilibrated, acetoxy-bearing siloxanes which comprises reacting cyclic siloxanes, in particular comprising $D_4$ and/or $D_5$, and/or cyclic branched siloxanes of the D/T type with acetic anhydride using preferably trifluoromethanesulfonic acid as catalyst and with addition of acetic acid, wherein the cyclic branched siloxanes of the D/T type are mixtures of cyclic branched siloxanes of the D/T type which may contain not only siloxanes comprising D and T units but also siloxanes comprising Q units.

16 Claims, No Drawings

(56) References Cited

U.S. PATENT DOCUMENTS

| | | | |
|---|---|---|---|
| 8,957,009 B2 | 2/2015 | Schubert et al. | |
| 8,969,502 B2 | 3/2015 | Knott et al. | |
| 8,974,627 B2 | 3/2015 | Schubert et al. | |
| 8,993,706 B2 | 3/2015 | Schubert et al. | |
| 9,005,361 B2 | 4/2015 | Henning et al. | |
| 9,035,011 B2 | 5/2015 | Ferenz et al. | |
| 9,068,044 B2 | 6/2015 | Schubert et al. | |
| 9,315,614 B2 | 4/2016 | Schubert et al. | |
| 9,334,354 B2 | 5/2016 | Ferenz et al. | |
| 9,353,225 B2 | 5/2016 | Knott et al. | |
| 9,481,695 B2 | 11/2016 | Knott et al. | |
| 9,540,500 B2 | 1/2017 | Ferenz et al. | |
| 9,695,202 B2 | 7/2017 | Henning et al. | |
| 9,783,635 B2 | 10/2017 | Schubert et al. | |
| 9,783,656 B2 | 10/2017 | Lehmann et al. | |
| 9,845,391 B2 | 12/2017 | Lehmann et al. | |
| 9,868,699 B2 | 1/2018 | Nitz et al. | |
| 9,878,979 B2 | 1/2018 | Nitz et al. | |
| 9,896,541 B2 | 2/2018 | Fiedel et al. | |
| 9,975,909 B2 | 5/2018 | Schubert et al. | |
| 10,087,278 B2 | 10/2018 | Fiedel et al. | |
| 10,093,605 B2 | 10/2018 | Bajus et al. | |
| 10,099,211 B2 | 10/2018 | Knott et al. | |
| 10,106,649 B2 | 10/2018 | Fiedel et al. | |
| 10,266,658 B2 | 4/2019 | Henning et al. | |
| 10,392,340 B2 | 8/2019 | Rittsteiger et al. | |
| 10,399,051 B2 | 9/2019 | Favresse et al. | |
| 10,399,998 B2 * | 9/2019 | Knott | C08G 77/18 |
| 10,407,592 B2 | 9/2019 | Amajjahe et al. | |
| 10,414,871 B2 | 9/2019 | Knott et al. | |
| 10,414,872 B2 | 9/2019 | Knott et al. | |
| 10,519,280 B2 | 12/2019 | Knott et al. | |
| 10,526,454 B2 | 1/2020 | Knott et al. | |
| 10,544,267 B2 | 1/2020 | Knott et al. | |
| 2002/0161158 A1 | 10/2002 | Burkhart et al. | |
| 2007/0128143 A1 | 6/2007 | Gruning et al. | |
| 2008/0125503 A1 | 5/2008 | Henning et al. | |
| 2009/0137752 A1 | 5/2009 | Knott et al. | |
| 2010/0022435 A1 | 1/2010 | Henning et al. | |
| 2010/0029587 A1 | 2/2010 | Brueckner et al. | |
| 2010/0081781 A1 | 4/2010 | Schubert et al. | |
| 2010/0239771 A1 * | 9/2010 | Liu | C08L 83/04 427/387 |
| 2011/0230619 A1 | 9/2011 | Kuppert et al. | |
| 2011/0301254 A1 | 12/2011 | Knott et al. | |
| 2011/0306694 A1 | 12/2011 | Glos et al. | |
| 2012/0046486 A1 * | 2/2012 | Henning | C08G 77/08 556/451 |
| 2012/0068110 A1 | 3/2012 | Schubert et al. | |
| 2012/0190760 A1 | 7/2012 | Henning et al. | |
| 2012/0190762 A1 | 7/2012 | Hubei et al. | |
| 2012/0282210 A1 | 11/2012 | Henning et al. | |
| 2013/0041115 A1 | 2/2013 | Knott et al. | |
| 2013/0213267 A1 * | 8/2013 | Fiedel | C09K 3/00 106/403 |
| 2013/0259821 A1 | 10/2013 | Henning et al. | |
| 2013/0345318 A1 | 12/2013 | Schubert et al. | |
| 2014/0256844 A1 | 9/2014 | Henning et al. | |
| 2014/0309446 A1 | 10/2014 | Amajjahe et al. | |
| 2015/0004112 A1 | 1/2015 | Ritter et al. | |
| 2015/0004113 A1 | 1/2015 | Ritter et al. | |
| 2016/0130402 A1 | 5/2016 | Schubert et al. | |
| 2017/0198099 A1 | 7/2017 | Knott | |
| 2018/0016392 A1 | 1/2018 | Lobert et al. | |
| 2018/0134850 A1 * | 5/2018 | Knott | C08G 77/045 |
| 2018/0155264 A1 | 6/2018 | Bajus et al. | |
| 2018/0258228 A1 | 9/2018 | Amajjahe et al. | |
| 2018/0305596 A1 | 10/2018 | Schubert et al. | |
| 2019/0100625 A1 | 4/2019 | Knott et al. | |
| 2019/0106369 A1 | 4/2019 | Schubert et al. | |
| 2019/0106441 A1 | 4/2019 | Knott et al. | |
| 2019/0112502 A1 | 4/2019 | Sloot et al. | |
| 2019/0345101 A1 | 11/2019 | Cameretti et al. | |
| 2020/0055991 A1 * | 2/2020 | Knott | C08G 77/392 |
| 2020/0055992 A1 * | 2/2020 | Knott | C08G 77/14 |
| 2020/0216474 A1 | 7/2020 | Fiedel et al. | |
| 2020/0339612 A1 * | 10/2020 | Knott | C08G 77/46 |
| 2020/0377524 A1 * | 12/2020 | Knott | C07F 7/0832 |
| 2020/0377525 A1 * | 12/2020 | Knott | C07F 7/0878 |
| 2020/0377526 A1 * | 12/2020 | Knott | C08G 77/045 |
| 2020/0377660 A1 * | 12/2020 | Knott | C08G 77/18 |
| 2020/0377663 A1 * | 12/2020 | Favresse | C08G 77/14 |
| 2020/0377665 A1 * | 12/2020 | Knott | C08G 77/38 |
| 2020/0377666 A1 * | 12/2020 | Knott | C08G 77/46 |
| 2020/0377669 A1 * | 12/2020 | Knott | C08G 77/14 |

* cited by examiner

PROCESS FOR PRODUCING ACETOXY-BEARING SILOXANES

CROSS REFERENCE TO RELATED APPLICATIONS

This application is a 35 U.S.C. § 119 patent application which claims the benefit of European Application No. 19176872.0 filed May 28, 2019, which is incorporated herein by reference in its entirety.

FIELD

The present invention relates to a process for producing acidic, preferably superacidic, in particular trifluoromethanesulfonic acid-acidified, end-equilibrated, acetoxy-bearing siloxanes.

BACKGROUND

As reactive starting materials for producing SiOC-based silicone derivatives, in particular SiOC-based polyether siloxanes, acetoxy-bearing siloxanes having linear or branched structure type are important compound classes.

The as yet unpublished European patent applications having the application numbers EP18172882.5, EP18172876.7, EP17195510.7 and EP17204277.2 are concerned with the production of SiOC-bonded polyether siloxanes, wherein trifluoromethanesulfonic acid-acidified, equilibrated acetoxysiloxanes having linear or branched structure type are used as reactive intermediates.

On closer investigation of the modes of production recited in these documents for producing the acetoxysiloxanes used therein the inventors have found that immediately after their production the trifluoromethanesulfonic acid-acidified acetoxysiloxanes still comprise relatively large proportions of siloxane cycles (see to this end examples 3 and 6 of the present invention) which, however, upon storage of the siloxanes at 23° C. over the course of about 2 to 3 weeks become incorporated in the respective siloxane matrix in such a way that the content of remaining siloxane cycles ($D_4+D_5+D_6$) corresponds to the end equilibrium established at this temperature and a pressure of 1013.25 hPa.

The trifluoromethanesulfonic acid-acidified, equilibrated acetoxysiloxanes resulting therefrom thus meet all quality demands that may be placed on these reactive intermediates. However, it remains desirable to achieve improved kinetics of equilibration to allow immediate further processing of the intermediates.

SUMMARY

Against this background the present invention has for its object to provide a process for producing end-equilibrated acetoxy-bearing siloxanes which advantageously accelerates the kinetics of equilibration such that reactive siloxanes capable of immediate further processing are already isolated at the end of the production process.

It has now been found in the context of the present invention that, surprisingly, end-equilibrated acetoxysiloxanes of both linear and branched structure type are obtainable in advantageous manner when the reactions described in the as yet unpublished European patent applications having the application numbers EP18172882.5, EP18172876.7, EP17195510.7 and EP17204277.2 are implemented in particular with addition of acetic acid.

DETAILED DESCRIPTION

The present invention provides a process for producing acidic, preferably superacidic, in particular trifluoromethanesulfonic acid-acidified, end-equilibrated, acetoxy-bearing siloxanes which comprises reacting cyclic siloxanes, in particular comprising $D_4$ and/or $D_5$, and/or mixtures of cyclic branched siloxanes of the D/T type, optionally in admixture with hydroxyl-bearing siloxanes and/or acetoxy- and/or alkoxy-bearing silanes and/or siloxanes, with acetic anhydride using acid, preferably superacid, in particular trifluoromethanesulfonic acid, as catalyst and with addition of acetic acid, wherein the employed cyclic branched siloxanes of the D/T type are mixtures of cyclic branched siloxanes of the D/T type which contain not only siloxanes comprising D and T units but optionally also siloxanes comprising Q units with the proviso that in these mixtures the proportion of Si atoms derived from Q units is ≤10% by mass to ≥0% by mass, preferably ≤5% by mass to ≥0% by mass, wherein the lower limit may be >0% or =0% by mass, but in particular is 0% by mass, in each case based on the entirety of all Si atoms, with the proviso that, if no mixtures of cyclic branched siloxanes of the D/T type which contain siloxanes comprising Q units are employed, the acid(s) employed are not solely trifluoromethanesulfonic acid or not solely trifluoromethanesulfonic acid and acetic acid.

In a preferred embodiment of the process according to the invention the sole use of trifluoromethanesulfonic acid and the sole use of trifluoromethanesulfonic acid and acetic acid as acid(s) are excluded.

In terms of the usability of DT cycles the inventors have found that not only mixtures of cyclic branched siloxanes of the D/T type which consist (in particular exclusively) of siloxanes comprising D and T units and whose $^{29}$Si NMR spectroscopy-determinable cumulative proportion of D and T units comprising Si-alkoxy and/or SiOH groups present in the siloxane matrix is less than 2 mole percent, preferably less than 1 mole percent, and which advantageously further contain at least 5% by weight of siloxane cycles, such as preferably octamethylcyclotetrasiloxane ($D_4$), decamethylcyclopentasiloxane ($D_5$) and/or mixtures thereof, but also mixtures of cyclic branched siloxanes comprising (in particular exclusively) D and T units whose $^{29}$Si NMR spectroscopy-determinable cumulative proportion of D and T units comprising Si-alkoxy and/or SiOH groups present in the siloxane matrix is greater than 2 and less than 10 mole percent are particularly suitable for use according to the invention.

The cyclic branched siloxanes of the D/T type usable according to the invention are not only described by way of example in the experimental part but also described in detail in the European patent application EP3321304A1 and in the as yet unpublished patent application EP 17169876.4. Both documents are accordingly incorporated in their entirety into the disclosure content of this invention. The provision of mixtures of cyclic branched siloxanes of the D/T type which contain not only siloxanes comprising D and T units but also siloxanes comprising Q units is readily achievable by those skilled in the art for example by analogy to the teaching of the two recited documents using for example silicic esters ($Si(OR)_4$) providing Q units.

In a preferred embodiment of the invention the acids employed in addition to acetic acid in accordance with the invention are superacids. Superacids are well known to those skilled in the art and are generally acids stronger than concentrated 100% sulfuric acid ($H_2SO_4$: pKa=−3.0). The acid strength is generally quantified using the Hammett acidity function. In a further preferred embodiment of the invention the employed acids are accordingly superacids having a $pK_a$ of less than −3.0, preferably fluorinated and/or perfluorinated sulfonic acids, fluorosulfonic acid $HSO_3F$, fluoroantimonic acid $HSbF_6$, perfluorobutanesulfonic acid $C_4F_9SO_3H$ and very particularly preferably trifluoromethanesulfonic acid $CF_3SO_3H$.

In a preferred embodiment of the invention the process according to the invention employs acetoxy-bearing silanes, in particular diacetoxydimethylsilane and/or triacetoxymethylsilane.

In a further preferred embodiment of the invention the process according to the invention employs alkoxy-bearing silanes, in particular triethoxysilane and/or trimethoxysilane and/or diethoxysilane and/or triethoxysilane and/or silicic esters $Si(OR)_4$, preferably where R=methyl or ethyl.

Suitable for obtaining the mixtures of cyclic branched siloxanes comprising (in particular exclusively) D and T units whose $^{29}Si$ NMR spectroscopy-determinable cumulative proportion of D and T units comprising Si-alkoxy and/or SiOH groups present in the siloxane matrix is greater than 2 and less than 10 mole percent is in particular a process comprising the steps of (a) an acid-catalyzed equilibration of trialkoxysilanes with siloxane cycles and/or α,ω-dihydroxypolydimethylsiloxane in the presence of at least one acidic catalyst and then (b) a hydrolysis and condensation reaction initiated by addition of water, and addition of a silicon-containing solvent, followed by (c) a distillative removal of the alcohol released, of water present in the system and of silicon-containing solvent, and a neutralization or removal of the acidic catalyst and optionally removal of salts that have possibly formed, wherein the silicon-containing solvent preferably comprises the isomeric siloxane cycles octamethylcyclotetrasiloxane ($D_4$), decamethylcyclotetrasiloxane ($D_5$) and/or mixtures thereof and mass ratios of silicon-containing solvent to the siloxane comprising D and T units of 1:1 to 5:1 are advantageously employed as described in the as yet unpublished patent application EP 17169876.4.

Shown hereinbelow by way of example for the sake of enablement is the production of these abovementioned mixtures of cyclic branched siloxanes comprising (in particular exclusively) D and T units: In a 500 ml four-necked round-bottomed flask with a KPG stirrer and fitted with a reflux cooler, 52.2 g (0.293 mol) of methyltriethoxysilane are heated to 60° C. together with 130.3 g (0.351 mol) of decamethylcyclopentasiloxane while stirring, 0.400 g of trifluoromethanesulfonic acid is added and the mixture is equilibrated for 4 hours. Then 15.8 g of water and 4.0 g of ethanol are added and the mixture is heated to reflux temperature (about 80° C.) for a further 4 hours. 10.6 g of water and 200 ml of decamethylcyclopentasiloxane ($D_5$) are added and the reflux cooler is exchanged for a distillation bridge, and the constituents that are volatile up to 90° C. are distilled off within the next hour. The reaction mixture is left at 90° C. for a further 2 hours, then allowed to cool down to 50° C., and 5 ml of a 25% aqueous ammonia solution are added and the mixture is stirred for a further hour to complete the neutralization. At 100° C. and with an auxiliary vacuum of <1 mbar applied, water and the decamethylcyclopentasiloxane ($D_5$) used as solvent are distilled off After cooling the distillation bottoms, with the aid of a pleated filter, the precipitated ammonium triflate is removed. The filtrate is a colorless mobile liquid, whose $^{29}Si$ NMR spectrum shows a D/T ratio of 6.1:1 (target 6.0:1). Based on the sum of the Si units detected by spectroscopy, the D and T units bearing Si-alkoxy and SiOH groups respectively have a proportion of 4.1 mole percent.

Suitable for obtaining the mixtures of cyclic branched siloxanes of the D/T type which consist (in particular exclusively) of siloxanes comprising D and T units and whose $^{29}Si$ NMR spectroscopy-determinable cumulative proportion of D and T units comprising Si-alkoxy and/or SiOH groups present in the siloxane matrix is ≤2 mole percent, preferably less than 1 mole percent, and which advantageously further contain at least 5% by weight of siloxane cycles, such as preferably octamethylcyclotetrasiloxane ($D_4$), decamethylcyclopentasiloxane ($D_5$) and/or mixtures thereof, is in particular a process in which a trialkoxysilane is reacted in a solvent with siloxane cycles and/or α,ω-dihydroxypolydimethylsiloxane with addition of water and in the presence of at least one acidic catalyst as described in European patent application EP3321304A1. Example 1 of the present invention shows by way of example the production of corresponding mixtures of cyclic branched siloxanes of the D/T type.

A preferred embodiment of the invention comprises adding acetic acid in amounts of 0.4 to 3.5 percent by weight, by preference 0.5 to 3 percent by weight, preferably 0.8 to 1.8 percent by weight, particularly preferably in amounts of 1.0 to 1.5 percent by weight, based on the reaction matrix comprising (in particular consisting of) acetic anhydride and cyclic siloxanes comprising $D_4$ and/or $D_5$ or comprising (in particular consisting of) acetic anhydride and mixtures of cyclic branched siloxanes of the D/T type or comprising (in particular consisting of) cyclic siloxanes comprising $D_4$ and/or $D_5$ and mixtures of cyclic branched siloxanes of the D/T type.

In a preferred embodiment of the invention the acid, preferably superacid, in particular trifluoromethanesulfonic acid employed as catalyst in addition to the acetic acid is employed in amounts of 0.1 to 1.0 percent by mass, preferably 0.1 to 0.3 percent by mass, based on the reaction matrix comprising (in particular consisting thereof) acetic anhydride and cyclic siloxanes, in particular comprising $D_4$ and/or $D_5$, and/or cyclic branched siloxanes of the D/T type.

The term "end-equilibrated" is to be understood as meaning that the equilibrium established at a temperature of 23° C. and a pressure of 1013.25 hPa has been reached. Employable as an indicator for reaching the equilibrium is the total cycles content determined by gas chromatography and defined as the sum of the $D_4$-, $D_5$-, $D_6$-contents based on the siloxane matrix and ascertained after derivatization of the α,ω-diacetoxypolydimethylsiloxanes to the corresponding α,ω-diisopropoxypolydimethylsiloxanes or after derivatization of the branched acetoxysiloxanes to the corresponding branched isopropoxysiloxanes. The inventive use of acetic acid here makes it possible to readily undershoot otherwise customary equilibrium proportions of about 13 percent by weight of total cycles content for the linear α,ω-diacetoxypolydimethylsiloxanes and of about 8 percent by weight of total cycles content for the branched acetoxysiloxanes. It is therefore in accordance with a preferred embodiment when equilibrium proportions of the total cycles content of less than 13, preferably less than 12, percent by weight for the linear α,ω-diacetoxypolydimethylsiloxanes and equilibrium proportions of the total cycles content of less than 8, preferably less than 7, percent by weight for the branched acetoxysiloxanes are undershot. The derivatization to afford the α,ω-diisopropoxypolydimethylsiloxanes or to afford the branched isopropoxysiloxanes is intentionally chosen in order to prevent a thermally induced retrocleavage reaction of the α,ω-diacetoxypolydimethylsiloxanes or of the branched acetoxysiloxanes which may take place under the conditions of analysis by gas chromatography (regarding the retrocleavage reaction see inter alia J. Pola et al., Collect. Czech. Chem. Commun. 1974, 39(5), 1169-1176 and also W. Simmler, Houben-Weyl, Methods of Organic Chemistry, Vol. VI/2, 4th Edition, 0-Metal Derivates of Organic Hydroxy Compounds p. 162 ff)).

In a preferred embodiment the reaction is carried out in a temperature range of 140° C. to 160° C. and over a duration of 4 to 8 hours.

The present invention further relates to acidic, preferably superacidic, in particular trifluoromethanesulfonic acid-acidified, end-equilibrated linear α,ω-acetoxy-bearing siloxanes having total cycles contents defined as the sum of the content fractions of the cyclic siloxanes comprising $D_4$, $D_5$ and $D_6$ based on the siloxane matrix and determined by gas chromatography after their derivatization to afford the corresponding linear α,ω-isopropoxysiloxanes of less than 13, preferably less than 12, percent by weight, produced by a process according to the invention as described above.

The present invention further relates to acidic, preferably superacidic, in particulartrifluoromethanesulfonic acid-acidified, end-equilibrated branched acetoxy-bearing siloxanes having total cycles contents defined as the sum of the content fractions of the cyclic siloxanes comprising $D_4$, $D_5$ and $D_6$ based on the siloxane matrix and determined by gas chromatography after their derivatization to afford the corresponding branched isopropoxysiloxanes of less than 8, preferably less than 7, percent by weight, produced by a process according to the invention as described above.

The present invention further relates to the use of the end-equilibrated acidic, preferably superacidic, in particular trifluoromethanesulfonic acid-acidified acetoxy-bearing siloxanes as described above as starting materials for the production of SiOC-bonded polyether siloxanes for use thereof in PU foam stabilizers, in defoamers, in demulsifiers, in emulsifiers and in paint and flow control additives; and also for use thereof as deaerators; as foam stabilizer, in particular as polyurethane foam stabilizer; as wetting agents; as hydrophobizing agents; as flow control agents; for producing polymer dispersions for production of adhesives or sealants; for surface treatment of fibers, particles or textile fabrics, in particular for treatment or impregnation of textiles, for production of paper towels, in the coating of fillers; for production of cleaning and care formulations for household use or for industrial applications, in particular for production of fabric softeners; for production of cosmetic, pharmaceutical and dermatological compositions, in particular cosmetic cleaning and care formulations, hair treatment agents and hair aftertreatment agents; for cleaning and care of hard surfaces; as processing aids in the extrusion of thermoplastics; for producing thermoplastic molded articles and/or as an adjuvant in plant protection; for production of building material compositions.

EXAMPLES

The examples which follow are provided merely to elucidate this invention to those skilled in the art and do not constitute any limitation of the claimed subject matter whatsoever. The determination of water contents is in principle performed by the Karl Fischer method based on DIN 51777, DGF E-III 10 and DGF C-III 13a. $^{29}$Si-NMR spectroscopy was used for reaction monitoring in all examples.

In the context of the present invention the $^{29}$Si NMR samples are analyzed at a measurement frequency of 79.49 MHz in a Bruker Avance III spectrometer equipped with a 287430 sample head with gap width of 10 mm, dissolved at 22° C. in $CDCl_3$ and against a tetramethylsilane (TMS) external standard [δ($^{29}$Si)=0.0 ppm].

GPCs (gel permeation chromatography) are recorded using THF as the mobile phase on an SDV 1000/10000A column combination having a length of 65 cm, ID 0.80, at a temperature of 30° C. using a SECcurity$^2$ GPC System 1260 (PSS Polymer Standards Service GmbH).

The gas chromatograms are recorded on an Agilent Technologies GC 7890B GC instrument fitted with an HP-1 column having dimensions of 30 m×0.32 mm ID×0.25 μm dF (Agilent Technologies No. 19091Z-413E) using hydrogen as a carrier gas and employing the following parameters:
Detector: FID; 310° C.
Injector: Split; 290° C.
Mode: constant flow, 2 ml/min
Temperature programme: 60° C. at 8° C./min –150° C. at 40° C./min –300° C. 10 min.

Employed as an indicator for reaching the equilibrium is the total cycles content determined by gas chromatography and defined as the sum of the $D_4$-, $D_5$-, $D_6$-contents based on the siloxane matrix and ascertained after derivatization of the α,ω-diacetoxypolydimethylsiloxanes to the corresponding α,ω-diisopropoxypolydimethylsiloxanes. The derivatization to afford the α,ω-diisopropoxypolydimethylsiloxanes is intentionally chosen in order to prevent a thermally induced retrocleavage reaction of the α,ω-diacetoxypolydimethylsiloxanes which may take place under the conditions of analysis by gas chromatography (regarding the retrocleavage reaction see inter alia J. Pola et al., Collect. Czech. Chem. Commun. 1974, 39(5), 1169-1176 and also W. Simmler, Houben-Weyl, Methods of Organic Chemistry, Vol. VI/2, 4th Edition, O-Metal Derivates of Organic Hydroxy Compounds p. 162 ff)).

Example 1

Production of a cyclic branched siloxane having a target D/T ratio of 6:1

In a 10 l four-necked round-bottomed flask with a KPG stirrer and fitted with a reflux cooler 783 g (4.39 mol) of methyltriethoxysilane together with 978.7 g (2.64 mol) of decamethylcyclopentasiloxane are heated to 60° C. with stirring, admixed with 2.98 g of trifluoromethanesulfonic acid and the mixture is equilibrated for 4 hours. 237 g of water and 59.3 g of ethanol are then added and the batch is heated to reflux temperature for a further 2 hours. 159.0 g of water and 978.8 g (2.64 mol) of decamethylcyclopentasiloxane ($D_5$) are added and the reflux cooler is exchanged for a distillation bridge and the constituents that are volatile up to 90° C. are distilled off over the next hour. 3000 ml of toluene are then added to the reaction batch and the water still present in the system is removed by distillation up to a bottoms temperature of 100° C. at the water separator. The reaction mixture is allowed to cool to about 60° C., the acid is neutralized by addition of 60.0 g of solid sodium hydrogencarbonate, and the mixture is then stirred for a further 30 minutes to achieve complete neutralization. After cooling to 25° C. the salts are removed with the aid of a pleated filter.

At 70° C. and with an auxiliary vacuum of <1 mbar applied, the toluene used as solvent is distilled off. The distillation bottoms are a colorless mobile liquid, whose $^{29}$Si NMR spectrum shows a D/T ratio of 6.2:1 (target 6.0:1). Based on the sum of the Si units detected by spectroscopy, the D and T units bearing Si-alkoxy and SiOH groups respectively, have a proportion of 0.52 mole percent. The gas chromatography analysis of the liquid also shows a proportion of about 15 percent by weight of simple siloxane cycles in the form of $D_4$, $D_5$ and $D_6$. The GPC has a broad molar mass distribution, characterized by Mw=55 258 g/mol; Mn: 1693 g/mol and Mw/Mn=32.63.

Example 2 (Inventive)

Production of an acetoxy-terminated, branched siloxane with 1.5% acetic acid addition In a 1000 ml four-necked flask with a KPG stirrer, internal thermometer and fitted with a reflux cooler 49.9 g (0.489 mol) of acetic anhydride together with 268.1 g of the DT cycles produced in example 1 (D/T ratio according to $^{29}$Si-NMR spectrum=6.18:1, M=525.42 g/mol and a proportion of SiOH/SiOEt moieties of 0.52 mol %) and 188.5 g of decamethylcyclopentasiloxane ($D_5$) are initially charged with stirring and admixed with 1.03 g (0.56 ml) of trifluoromethanesulfonic acid (0.2% by mass based on the total batch) and 7.6 g of acetic acid (1.5% based on the mass of the reactants) and swiftly heated to 150° C. The initially slightly cloudy reaction mixture is held at this temperature for 6 hours with continued stirring.

After cooling of the batch a colorless clear mobile liquid whose $^{29}$Si-NMR spectrum demonstrates the presence of Si-acetoxy groups in a yield of about 88.2% based on the employed acetic anhydride and the complete disappearance of spectroscopically detectable proportions of Si-alkoxy and SiOH groups is isolated.

Conversion of the Branched Acetoxysiloxane into the Corresponding Branched Isopropoxysiloxane for Analytical Characterization Immediately after the synthesis in a 250 ml four-necked round-bottomed flask fitted with a KPG stirrer, internal thermometer and a reflux cooler 100.0 g of this trifluoromethanesulfonic acid-acidified, equilibrated branched acetoxysiloxane are mixed together with 23.2 g of a molecular sieve-dried isopropanol by stirring at 22° C. Gaseous ammonia ($NH_3$) is then introduced to the reaction mixture until alkaline reaction (moist universal indicator paper) and the mixture is then stirred at this temperature for a further 45 minutes. The precipitated salts are separated using a pleated filter.

A colorless, clear liquid is isolated, whose accompanying $^{29}$Si-NMR spectrum demonstrates the quantitative conversion of the branched acetoxysiloxane into a branched isopropoxysiloxane.

An aliquot of this branched isopropoxysiloxane is withdrawn and analyzed by gas chromatography. The gas chromatogram shows the following contents (reported in percent by mass):

| $D_4$ | $D_5$ | $D_6$ | Total ($D_4$-$D_6$) | Isopropanol content |
|---|---|---|---|---|
| 2.3% | 1.4% | 0.4% | 4.1% | 7.1% |

Taking account of the isopropanol excess the contents of siloxane cycles ($D_4$, $D_5$ and $D_6$) are calculated solely based on the siloxane proportion.

Example 3 (Noninventive)

Production of an acetoxy-terminated branched siloxane

In a 1000 ml four-necked flask with a KPG stirrer, internal thermometer and fitted with a reflux cooler 49.9 g (0.489 mol) of acetic anhydride together with 268.1 g of the DT cycles produced in example 1 (D/T ratio according to $^{29}$Si-NMR spectrum=6.18:1, M=525.42 g/mol and a proportion of SiOH/SiOEt moieties of 0.52 mol %) and 188.5 g of decamethylcyclopentasiloxane ($D_5$) are initially charged with stirring and admixed with 1.03 g (0.56 ml) of trifluoromethanesulfonic acid (0.2 mass % based on the total batch) and rapidly heated to 150° C. The initially slightly cloudy reaction mixture is held at this temperature for 6 hours with continued stirring.

After cooling of the batch a colorless clear mobile liquid whose $^{29}$Si-NMR spectrum demonstrates the presence of Si-acetoxy groups in a yield of about 92.3% based on the employed acetic anhydride and the complete disappearance of spectroscopically detectable proportions of Si-alkoxy and SiOH groups is isolated.

Conversion of the Branched Acetoxysiloxane into the Corresponding Branched Isopropoxysiloxane for Analytical Characterization Immediately after the synthesis in a 250 ml four-necked round-bottomed flask fitted with a KPG stirrer, internal thermometer and a reflux cooler 100.0 g of this trifluoromethanesulfonic acid-acidified, equilibrated branched acetoxysiloxane are mixed together with 23.2 g of a molecular sieve-dried isopropanol by stirring at 22° C. Gaseous ammonia ($NH_3$) is then introduced to the reaction mixture until alkaline reaction (moist universal indicator paper) and the mixture is then stirred at this temperature for a further 45 minutes. The precipitated salts are separated using a pleated filter.

A colorless, clear liquid is isolated, whose accompanying $^{29}$Si-NMR spectrum demonstrates the quantitative conversion of the branched acetoxysiloxane into a branched isopropoxysiloxane.

An aliquot of this branched isopropoxysiloxane is withdrawn and analyzed by gas chromatography. The gas chromatogram shows the following contents (reported in percent by mass):

| $D_4$ | $D_5$ | $D_6$ | Total ($D_4$-$D_6$) | Isopropanol content |
|---|---|---|---|---|
| 2.03% | 21.85% | 0.83% | 24.71% | 11.7% |

Taking account of the isopropanol excess the contents of siloxane cycles ($D_4$, $D_5$ and $D_6$) are calculated solely based on the siloxane proportion.

Example 4 (Inventive)

Production of an acetoxy-terminated, linear polydimethylsiloxane with 1.5% acetic acid addition In a 1000 ml four-necked flask fitted with a KPG stirrer, internal thermometer and a reflux cooler 77.3 g (0.757 mol) of acetic anhydride together with 732.8 g (1.98 mol) of decamethylcyclopentasiloxane ($D_5$) and 12.2 g of acetic acid (1.5% by weight based on the total mass of the reactants) are initially charged with stirring and admixed with 1.62 g (0.88 ml) of trifluoromethanesulfonic acid (0.2 percent by mass based on the total batch) and swiftly heated to 150° C. The initially slightly cloudy reaction mixture is held at this temperature for 6 hours with continued stirring.

After cooling of the batch a colorless, clear, mobile liquid is isolated, whose $^{29}$Si-NMR spectrum demonstrates the presence of Si-acetoxy groups in a yield of about 93% based on employed acetic anhydride corresponding to an α,ω-diacetoxypolydimethylsiloxane having an average total chain length of about 14.

Conversion of the α,ω-Diacetoxypolydimethylsiloxane into the Corresponding α,ω-Diisopropoxypolydimethylsiloxane for Analytical Characterization Immediately after the synthesis in a 250 ml four-necked round-bottomed flask fitted with a KPG stirrer, internal thermometer and a reflux cooler 50.0 g of this trifluoromethanesulfonic acid-acidified, equilibrated α,ω-diacetoxypolydimethylsiloxane are mixed together with 11.3 g of a molecular sieve-dried isopropanol by stirring at 22° C. Gaseous ammonia (NH$_3$) is then introduced to the reaction mixture until alkaline reaction (moist universal indicator paper) and the mixture is then stirred at this temperature for a further 45 minutes. The precipitated salts are separated using a pleated filter.

A colorless, clear liquid is isolated, whose accompanying $^{29}$Si-NMR spectrum demonstrates the quantitative conversion of the α,ω-diacetoxypolydimethylsiloxane into an α,ω-diisopropoxypolydimethylsiloxane.

An aliquot of this α,ω-diisopropoxypolydimethylsiloxane is withdrawn and analyzed by gas chromatography. The gas chromatogram shows the following contents (reported in percent by mass):

| $D_4$ | $D_5$ | $D_6$ | Total ($D_4$-$D_6$) | Isopropanol content |
|---|---|---|---|---|
| 4.94% | 4.04% | 1.07% | 10.06% | 11.00% |

Taking account of the isopropanol excess the contents of siloxane cycles ($D_4$, $D_5$ and $D_6$) are calculated solely based on the siloxane proportion.

Example 5 (Inventive)

Production of an acetoxy-terminated, linear polydimethylsiloxane with 3.0% acetic acid addition In a 1000 ml four-necked flask fitted with a KPG stirrer, internal thermometer and a reflux cooler 77.3 g (0.757 mol) of acetic anhydride together with 732.8 g (1.98 mol) of decamethylcyclopentasiloxane ($D_5$) and 24.3 g of acetic acid (3.0% by weight based on the total mass of the reactants) are initially charged with stirring and admixed with 1.62 g (0.88 ml) of trifluoromethanesulfonic acid (0.2 percent by mass based on the total batch) and swiftly heated to 150° C. The initially slightly cloudy reaction mixture is held at this temperature for 4 hours with continued stirring.

After cooling of the batch a colorless, clear, mobile liquid is isolated, whose $^{29}$Si-NMR spectrum demonstrates the presence of Si-acetoxy groups in a yield of about 93% based on employed acetic anhydride corresponding to an α,ω-diacetoxypolydimethylsiloxane having an average total chain length of about 14.

Conversion of the α,ω-Diacetoxypolydimethylsiloxane into the Corresponding α,ω-Diisopropoxypolydimethylsiloxane for Analytical Characterization Immediately after the synthesis in a 250 ml four-necked round-bottomed flask fitted with a KPG stirrer, internal thermometer and a reflux cooler 50.0 g of this trifluoromethanesulfonic acid-acidified, equilibrated α,ω-diacetoxypolydimethylsiloxane are mixed together with 11.3 g of a molecular sieve-dried isopropanol by stirring at 22° C. Gaseous ammonia (NH$_3$) is then introduced to the reaction mixture until alkaline reaction (moist universal indicator paper) and the mixture is then stirred at this temperature for a further 45 minutes. The precipitated salts are separated using a pleated filter.

A colorless, clear liquid is isolated, whose accompanying $^{29}$Si-NMR spectrum demonstrates the quantitative conversion of the α,ω-diacetoxypolydimethylsiloxane into an α,ω-diisopropoxypolydimethylsiloxane.

An aliquot of this α,ω-diisopropoxypolydimethylsiloxane is withdrawn and analyzed by gas chromatography. The gas chromatogram shows the following contents (reported in percent by mass):

| $D_4$ | $D_5$ | $D_6$ | Total ($D_4$-$D_6$) | Isopropanol content |
|---|---|---|---|---|
| 4.09% | 2.62% | 0.86% | 7.57% | 4.60% |

Taking account of the isopropanol excess the contents of siloxane cycles ($D_4$, $D_5$ and $D_6$) are calculated solely based on the siloxane proportion.

Example 6 (Noninventive)

Production of an acetoxy-terminated, linear polydimethylsiloxane

In a 1000 ml four-necked flask fitted with a KPG stirrer, internal thermometer and a reflux cooler 77.3 g (0.757 mol) of acetic anhydride together with 732.8 g (1.98 mol) of decamethylcyclopentasiloxane ($D_5$) are initially charged with stirring and admixed with 1.62 g (0.88 ml) of trifluoromethanesulfonic acid (0.2 percent by mass based on the total batch) and swiftly heated to 150° C. The initially slightly cloudy reaction mixture is held at this temperature for 6 hours with continued stirring.

After cooling of the batch a colorless, clear, mobile liquid is isolated, whose $^{29}$Si-NMR spectrum demonstrates the presence of Si-acetoxy groups in a yield of about 90% based on employed acetic anhydride corresponding to an α,ω-diacetoxypolydimethylsiloxane having an average total chain length of about 14.

Conversion of the α,ω-Diacetoxypolydimethylsiloxane into the Corresponding α,ω-Diisopropoxypolydimethylsiloxane for Analytical Characterization Immediately after the synthesis in a 250 ml four-necked round-bottomed flask fitted with a KPG stirrer, internal thermometer and a reflux cooler 50 g of this trifluoromethanesulfonic acid-acidified, equilibrated α,ω-diacetoxypolydimethylsiloxane are mixed together with 11.3 g of a molecular sieve-dried isopropanol by stirring at 22° C. Gaseous ammonia (NH$_3$) is then introduced to the reaction mixture until alkaline reaction (moist universal indicator paper) and the mixture is then stirred at this temperature for a further 45 minutes. The precipitated salts are separated using a pleated filter.

A colorless, clear liquid is isolated, whose accompanying $^{29}$Si-NMR spectrum demonstrates the quantitative conversion of the α,ω-diacetoxypolydimethylsiloxane into an α,ω-diisopropoxypolydimethylsiloxane.

An aliquot of this α,ω-diisopropoxypolydimethylsiloxane is withdrawn and analyzed by gas chromatography. The gas chromatogram shows the following contents:

| D₄ | D₅ | D₆ | Total (D₄-D₆) | Isopropanol content |
|---|---|---|---|---|
| 1.72% | 39.12% | 0.88 | 41.72 | 9.50 |

Taking account of the isopropanol excess the contents of siloxane cycles ($D_4$, $D_5$ and $D_6$) are calculated solely based on the siloxane proportion.

The invention claimed is:

1. A process for producing acidic, a superacidic, or a trifluoromethanesulfonic acid-acidified, end-equilibrated, acetoxy-bearing siloxane, wherein the process comprises
reacting cyclic siloxanes comprising $D_4$ and/or $D_5$, and/or mixtures of cyclic branched siloxanes of the D/T type,
optionally in admixture with hydroxyl-bearing siloxanes and/or acetoxy- and/or alkoxy-bearing silanes and/or siloxanes,
with acetic anhydride using the acid, superacid, or trifluoromethanesulfonic acid, as catalyst and with addition of acetic acid,
wherein the cyclic branched siloxanes of the D/T type are mixtures of cyclic branched siloxanes of the D/T type, which contain not only siloxanes comprising D and T units but optionally also siloxanes comprising Q units with the proviso that in these mixtures the proportion of Si atoms derived from Q units is ≤10% by mass to ≥0% by mass, based on the entirety of all Si atoms, wherein if no mixtures of cyclic branched siloxanes of the D/T type which contain siloxanes comprising Q units are employed.

2. The process according to claim 1, wherein the acids employed in addition to acetic acid are superacids having a $pK_a$ of less than −3.0.

3. The process according to claim 1, wherein diacetoxydimethylsilane and/or triacetoxymethylsilane are employed as acetoxy-bearing silanes.

4. The process according to claim 1, wherein triethoxysilane and/or trimethoxysilane and/or diethoxysilane and/or triethoxysilane are employed as alkoxy-bearing silanes.

5. The process according to claim 1, wherein the process comprises adding acetic acid in amounts of from 0.4 to 3.5 percent by weight based on the reaction matrix
comprising acetic anhydride and cyclic siloxanes comprising $D_4$ and/or $D_5$, or comprising acetic anhydride and mixtures of cyclic branched siloxanes of the D/T type, or
comprising cyclic siloxanes comprising $D_4$ and/or $D_5$ and mixtures of cyclic branched siloxanes of the D/T type.

6. The process according to claim 1, wherein mixtures of cyclic branched siloxanes of the D/T type which consist of siloxanes comprising D and T units and whose $^{29}$Si NMR spectroscopy-determinable cumulative proportion of D and T units comprising Si-alkoxy and/or SiOH groups present in the siloxane matrix is ≤2 mole percent, and which contain at least 5 percent by weight of siloxane cycles, octamethylcyclotetrasiloxane (D4), decamethylcyclopentasiloxane ($D_5$) and/or mixtures thereof, are employed.

7. The process according to claim 1, wherein mixtures of cyclic branched siloxanes comprising D and T units whose $^{29}$Si NMR spectroscopy-determinable cumulative proportion of D and T units comprising Si-alkoxy and/or SiOH groups present in the siloxane matrix is greater than 2 and less than 10 mole percent.

8. The process according to claim 1, wherein, in addition to the acetic acid, acid, superacid, or trifluoromethanesulfonic acid is employed in amounts of from 0.1 to 1.0 percent by mass, based on the reaction matrix comprising acetic anhydride and cyclic siloxanes, in particular comprising $D_4$ and/or $D_5$, and/or mixtures of cyclic branched siloxanes of the D/T type.

9. The process according to claim 1, wherein the reaction is carried out in a temperature range of from 140° C. to 160° C. and over a duration of from 4 to 8 hours.

10. The process according to claim 1, excluding the sole use of trifluoromethanesulfonic acid and the sole use of trifluoromethanesulfonic acid and acetic acid as acid(s).

11. The process according to claim 1, wherein the acids employed in addition to acetic acid are selected from the group consisting of fluorinated and/or perfluorinated sulfonic acids, fluorosulfonic acid $HSO_3F$, fluoroantimonic acid $HSbF_6$, and perfluorobutanesulfonic acid $C_4F_9SO_3H$.

12. The process according to claim 1, wherein the acids employed in addition to acetic acid is trifluoromethanesulfonic acid $CF_3SO_3H$.

13. The process according to claim 1, wherein the process comprises adding acetic acid in amounts of from 0.5 to 3 percent by weight, based on the reaction matrix comprising acetic anhydride and cyclic siloxanes comprising $D_4$ and/or $D_5$, or comprising acetic anhydride and mixtures of cyclic branched siloxanes of the D/T type, or comprising cyclic siloxanes comprising $D_4$ and/or $D_5$ and mixtures of cyclic branched siloxanes of the D/T type.

14. The process according to claim 1, wherein the process comprises adding acetic acid in amounts of from 1.0 to 1.5 percent by weight, based on the reaction matrix comprising acetic anhydride and cyclic siloxanes comprising $D_4$ and/or $D_5$, or comprising acetic anhydride and mixtures of cyclic branched siloxanes of the D/T type, or comprising cyclic siloxanes comprising D4 and/or $D_5$ and mixtures of cyclic branched siloxanes of the D/T type.

15. The process according to claim 1, wherein mixtures of cyclic branched siloxanes of the D/T type which consist of siloxanes comprising D and T units and whose $^{29}$Si NMR spectroscopy-determinable cumulative proportion of D and T units comprising Si-alkoxy and/or SiOH groups present in the siloxane matrix is ≤1 mole percent, and which contain at least 5 percent by weight of siloxane cycles, octamethylcyclotetrasiloxane (D4), decamethylcyclopentasiloxane ($D_5$) and/or mixtures thereof, are employed.

16. The process according to claim 1, wherein said acetic anhydride using the acid, superacid, or trifluoromethanesulfonic acid, as catalyst and with addition of acetic acid is employed in amounts of from 0.1 to 1.3 percent by mass, based on the reaction matrix comprising acetic anhydride and cyclic siloxanes, in particular comprising $D_4$ and/or $D_5$, and/or mixtures of cyclic branched siloxanes of the D/T type.

* * * * *